Figure 1:
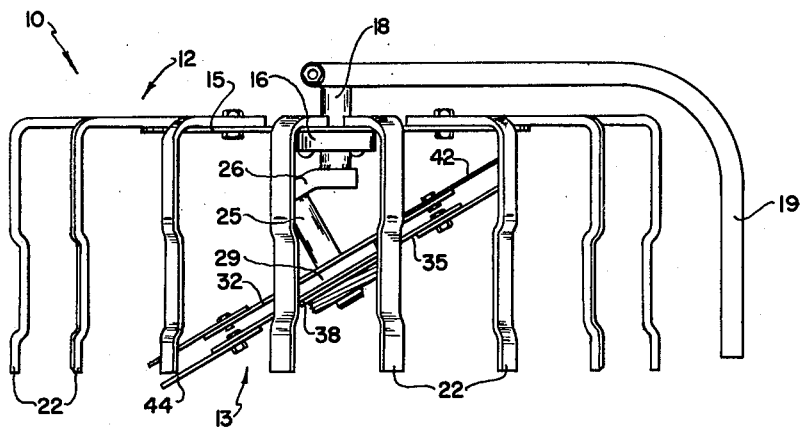

March 9, 1965 G. M. GUCCIONE 3,172,482
PLANT ROW THINNING APPARATUS

Filed July 29, 1963 2 Sheets-Sheet 1

INVENTOR
GIOACCHINO M. GUCCIONE
BY
*Featherstonhaugh & Co.*
ATTORNEYS

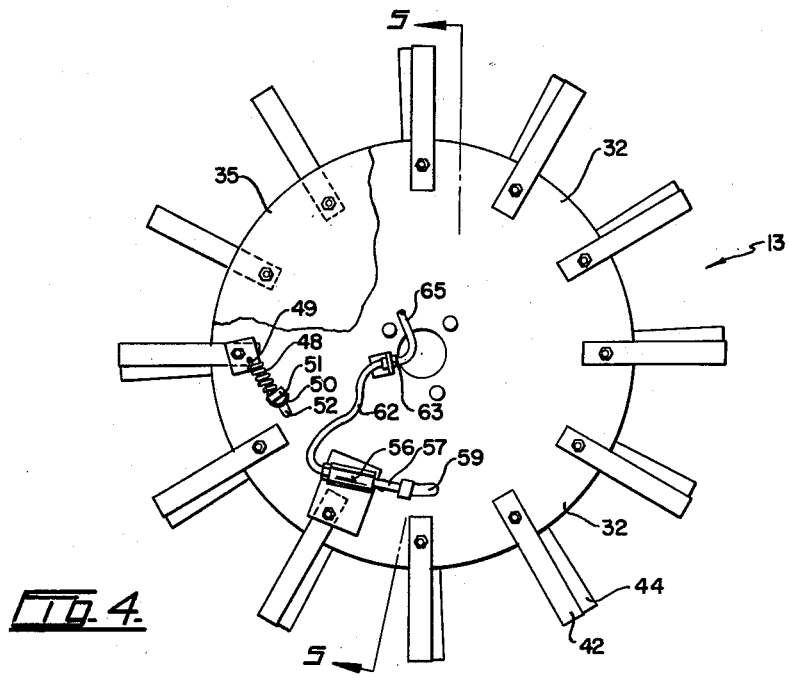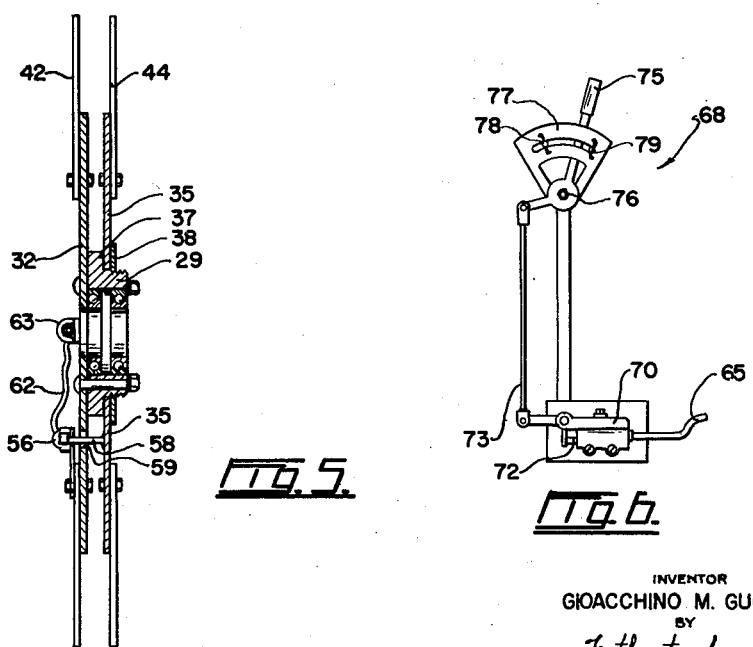

United States Patent Office 3,172,482
Patented Mar. 9, 1965

3,172,482
PLANT ROW THINNING APPARATUS
Gioacchino M. Guccione, 4904 54th Ave.,
Taber, Alberta, Canada
Filed July 29, 1963, Ser. No. 298,364
7 Claims. (Cl. 172—520)

This invention relates to apparatus for thinning out a row of plants as it is drawn along said row.

This apparatus is particularly designed for mechanically thinning out rows of sugar beet seedlings, but it is to be understood that it may be used for thinning out any plant row. A plurality of these units are usually mounted upon a tractor and drawn along the rows of sugar beet seedlings. However, for the sake of convenience and clarity, this apparatus is described herein as a single unit.

As the apparatus is drawn along a row of plants, it operates to scrape a predetermined percentage of plants laterally out of the row. Machines for accomplishing this were in existence prior to the present invention, but it was difficult and time-consuming to change the setting of the machine to scrape more or less plants from the row. As a result, even though the machine were set for a given field, the thinning was usually unsatisfactory since the thinning requirements usually vary throughout a field.

The main object of the present invention is the provision of apparatus for thinning out a row of plants and which may be adjusted by the operator on the tractor drawing the apparatus to different thinning rates without having to stop the thinning operation. This makes it possible to keep the apparatus functioning correctly for the plant densities encountered at all times.

A further object is the provision of very simple apparatus for quickly altering the adjustments of a plant thinner without having to stop the thinning operation.

This plant row thinning apparatus includes a foot unit rotatably mounted on a first central axle, said unit having a plurality of circumferentially spaced substantially L-shaped feet radiating therefrom adapted successively to walk along the ground as the apparatus is moved thereover. A second axle is carried by the first axle within the foot unit centrally thereof, said second axle being offset a little from the first axle and inclined relative thereto. A hub rotatably mounted on the second axle carries first and second parallel discs mounted thereon, one fixed to the hub and the other rotatably mounted thereon. Spaced blades radiate from each disc, and the apparatus includes means normally retaining the second disc relative to the first disc with the blades of said discs directly opposite each other whereby the blades are arranged in pairs and have a minimum effective width therebetween. These blades are long enough to project down between the unit feet so that the discs are rotated as the feet walk along the ground and the incline of the second axle causes the blades to scrape laterally between the feet during this rotation. Thus, the apparatus is drawn so that the feet travel down the row being thinned, and the blades scrape a predetermined percentage of the plants laterally out of the row. The number of plants scraped out by each pair of blades depends upon the effective width of said blades. In other words, if the blades are directly aligned with each other, the effective width is at a minimum, and if the discs are angularly displaced, the blades of each pair are shifted relative to each other to increase the effective width thereof. The apparatus includes hydraulic means mounted on the discs operable to cause relative rotation thereof to spread the blades of each pair apart to increase the effective width thereof, and remote control means for operating the hydraulic means. The remote control means is preferably mounted on the tractor near the driver's seat so that he can operate it to adjust the thinning action of the apparatus at will.

Figure 2:
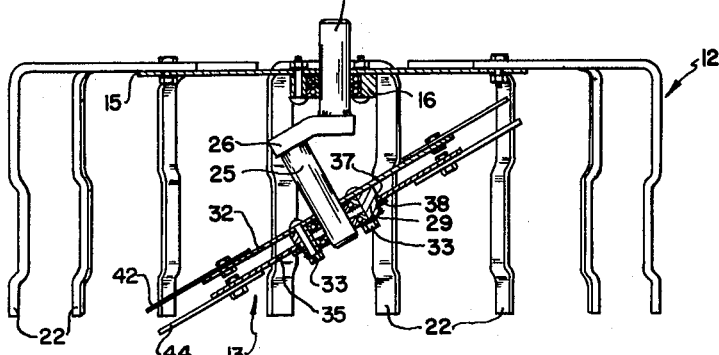
Figure 3:
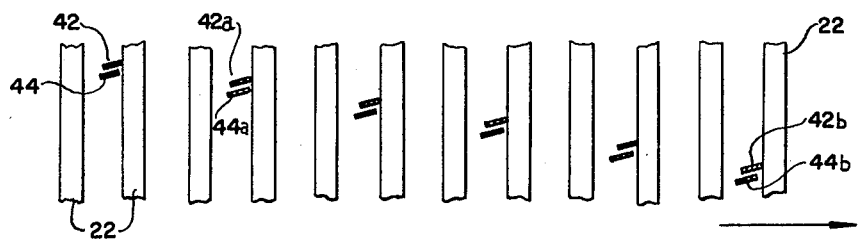

A preferred form of this invention is illustrated in the accompanying drawings, in which, FIGURE 1 is a plan view of the thinning apparatus,
FIGURE 2 is a horizontal section through the centre of the apparatus,
FIGURE 3 is a diagram illustrating the action of the blades relative to the unit feet,
FIGURE 4 is a side elevation of the apparatus,
FIGURE 5 is a vertical section taken on the line 5—5 of FIGURE 4, and through the discs only, and
FIGURE 6 is an elevation of the remote control means.

Referring to the drawings, 10 is a plant row thinning apparatus including a foot unit 12 surrounding a disc unit 13. Unit 12 includes a disc 15 radiating from a hub 16 rotatably mounted on an axle 18. This axle is carried by an arm 19 which is adapted to be mounted on the tool bar of a tractor in any desired manner. A plurality of substantially L-shaped feet 22 are evenly spaced around disc 12 and radiate therefrom. These feet enclose disc unit 13.

A second axle 25 is mounted on the inner end of axle 18 by means of a bracket 26. This bracket is shaped so that axle 25 is offset a little from axle 18 and is inclined relative thereto, as clearly shown in FIGURE 2. Disc unit 13 includes a hub 29 rotatably mounnted on axle 25. A disc 32 is fixedly mounted on hub 29 in any suitable manner, such as by bolts 33. Another disc 35 is rotatably mounted on hub 29. Disc 35 is held against a shoulder 37 formed on the hub by a retaining ring 38 so that disc 35 is firmly held in place although it can rotate around hub 29. A plurality of evenly spaced flat blades 42 are fixed to disc 32 and radiate therefrom. Similarly, a plurality of evenly spaced flat blades 44 are fixed to and radiate from disc 35, there being one blade 44 for and near each blade 42.

Suitable means is provided for normally maintaining each pair of blades 42–44 aligned with each other. In the illustrated example of the invention, a coil spring 48 is provided for this purpose. One end 49 of the spring is fixedly mounted to the outer surface of disc 32, and the opposite end 50 of the spring is connected to a pin 51 fixed to and projecting from disc 35 through a short slot 52 in disc 32. Spring 48 normally retains pin 51 at an end of slot 52, at which time the pairs of blades of discs 32 and 35 are aligned. At this time the blades have a minimum effective width which is equal to the width of one blade. Suitable power means is provided for relatively shifting discs 32 and 35 so that one blade of each pair is shifted relative to the other blade of said pair in order to increase the effective width of the blades. FIGURE 4 illustrates blades 44 offset relative to blades 42 to show how the effective width of these blades is increased.

Blades 42 and 44 are of such length that they extend down between feet 22 of unit 12 as said feet walk along the ground when apparatus 10 is drawn along said ground. As unit 12 rotates, the feet thereof engage blades 42–44 to cause disc unit 13 to rotate therewith. As unit 13 is inclined relative to unit 12, as clearly shown in FIGURE 2, blades 42–44 shift laterally relative to feet 22 during rotation of the unit. FIGURE 3 diagrammatically illustrates a pair of blades 42–44 as they are first engaged by a foot 22. As units 12 and 13 continue to rotate, blades 42–44 shift laterally to the position indicated by blades 42a–44a. Continued rotation shifts the blades laterally to the positions indicated by blades 42b and 44b. Thus, as feet 22 step along a row of plants, blades 42–44 shift laterally to scrape some of the plants out of the row. If blades 42 and 44 are directly opposite each other, a minimum number of plants are scraped out of the row by the blades, and as the blades 42 and 44 are shifted relative to each other to increase their effective width, more plants are scraped out of the row by the pairs of blades.

Suitable power means is provided for relatively rotating discs 32 and 35. This is preferably in the form of a hydraulic cylinder 56 mounted on the outer surface of disc 32 and having a piston rod 57 projecting therefrom, the outer end of which is connected to a pin 58 fixedly connected to and projecting from disc 35 and through a short slot 59 in disc 32, see FIGURE 4. A tube 62 for supplying hydraulic fluid to cylinder 56 extends from the outer end of said cylinder to a standard hydraulic swivel joint 63 mounted in disc 32 near the centre of rotation thereof. A hose 65 extends away from disc unit 13 to a remotely located control unit.

FIGURE 6 illustrates a hydraulic control unit 68 adapted to be mounted on a tractor which hauls apparatus 10. Unit 68 includes a master cylinder 70 to which hose 65 is removably connected. This cylinder has a piston rod 72 projecting from the end thereof which is moved in and out relative to the cylinder by linkage 73. An end of linkage 73 is connected to an operating lever 75 pivotally mounted at 76 and movable along a quadrant 77. This quadrant is provided with two adjustable stops 78 and 79 for the operating lever.

As stated above, during operation, apparatus 10 is drawn along a row of plants. Feet 22 walk along the row while blades 42–44 scrape a predetermined number of plants laterally out of the row. If blades 42–44 are retained in their normal positions by spring 48, these blades have a minimum effective width, and a minimum number of plants are scraped out of the row. By shifting operating lever 75, the driver of the tractor can adjust the effective width of the pairs of blades 42–44 to increase or decrease the number of plants being scraped out of the row. When lever 75 is shifted in one direction, hydraulic fluid is forced out of master cylinder 70 through hose 65, swivel connection 63 and tube 62 into cylinder 56 to force rod 57 out of said cylinder. When lever 75 is moved in the opposite direction, rod 57 is moved back into the cylinder by spring 48. Thus, in a very simple and effective manner, the driver can adjust the percentage of plants being scraped out of the row without having to stop the thinning operation.

What I claim as my invention is:

1. Apparatus for thinning out a row of plants and adapted to be drawn along said row, comprising a foot unit rotatably mounted on a first central axle, said unit having a plurality of circumferentially spaced substantially L-shaped feet radiating therefrom adapted successively to walk along the ground as the apparatus is moved over said ground, a second axle carried by the first axle within the foot unit centrally thereof, said second axle being offset a little from the first axle and inclined relative thereto, a hub rotatably mounted on the second axle, a first disc fixedly mounted on said hub, a second disc rotatably mounted on the hub parallel with the first disc, a shoulder on the hub between said discs and against which the second disc bears, means on the hub retaining the second disc against said shoulder while permitting said second disc to rotate on the hub, spaced blade radiating from each disc, means normally retaining the second disc relative to the first disc with the blades of said discs directly opposite each other whereby the blades are arranged in pairs and have a minimum effective width therebetween, said blades being low enough to project down between the unit feet so that the discs are rotated as the feet walk along the ground and the incline of the second axle causes the blades to scrape laterally relative to the feet during this rotation, hydraulic means mounted on and connected to the first and second discs operable to cause relative rotation thereof to spread the blades of each pair apart to increase the effective width thereof, and remote control means for operating the hydraulic means.

2. Thinning apparatus as claimed in claim 1 in which the means normally retaining the discs with the blades opposite each other, comprises a spring having an end connected to one disc and an opposite end connected to the other disc.

3. Thinning apparatus as claimed in claim 1 in which the means normally retaining the discs with the blades opposite each other, comprises a spring having an end connected to one disc and an opposite end connected to a pin projecting from the other disc, said pin projecting through a slot in the disc to which the spring is connected, said spring normally retaining the pin against one end of said slot.

4. Thinning apparatus as claimed in claim 1 in which the hydraulic means comprises a hydraulic cylinder mounted on the first disc, said cylinder having a piston rod projecting therefrom and connected to the second disc.

5. Thinning apparatus as claimed in claim 4 including a tube extending from the cylinder to a hydraulic swivel joint, and a hose extending from said swivel joint to said control means.

6. Thinning apparatus as claimed in claim 1 in which the hydraulic means comprises a hydraulic cylinder mounted on the first disc, said cylinder having a piston rod projecting therefrom and connected to a pin projecting from the second disc, said pin extending through a slot in the first disc.

7. Apparatus for thinning out a row of plants and adapted to be drawn along said row, comprising a foot unit rotatably mounted on a first central axle, said unit having a plurality of circumferentially spaced substantially L-shaped feet radiating therefrom adapted successively to walk along the ground as the apparatus is moved over said ground, a second axle carried by the first axle within the foot unit centrally thereof, said second axle being offset a little from the first axle and inclined relative thereto, a hub rotatably mounted on the second axle, a first disc fixedly mounted on said hub, a second disc rotatably mounted on the hub parallel with the first disc, a shoulder on the hub between said discs and against which the second disc bears, means on the hub retaining the second disc against said shoulder while permitting said second disc to rotate on the hub, spaced blades radiating from each disc, a spring having an end connected to one disc and an opposite end connected to a pin projecting from the other disc, said pin projecting through a slot in the disc to which the spring is connected, said spring normally retaining the pin against one end of said slot at which time the blades of said discs are positioned directly opposite each other whereby the blades are arranged in pairs and have a minimum effective width therebetween, said blades being long enough to project down between the unit feet so that the discs are rotated as the feet walk along the ground and the incline of the second axle causes the blades to scrape laterally relative to the feet during this rotation, a hydraulic cylinder mounted on the first disc, a piston rod projecting from the cylinder and connected to a pin projecting from the second disc, said pin extending through a slot in the first disc, said cylinder being operable to extend the piston rod therefrom and rotate the second disc on the hub to move said first-mentioned pin away from its slot end and thereby spread the blades of each pair apart to increase the effective width thereof, and hydraulic control means remote from and connected by tubing to said hydraulic cylinder adapted to operate the latter.

References Cited in the file of this patent
UNITED STATES PATENTS

| | | |
|---|---|---|
| 2,070,425 | Engel | Feb. 9, 1937 |
| 3,000,450 | Jongeneel | Sept. 19, 1961 |
| 3,058,243 | McGee | Oct. 16, 1962 |
| 3,101,123 | Schmidt | Aug. 20, 1963 |